Sept. 21, 1965  W. B. SMITH  3,206,851
WIRE ANCHOR

Filed April 16, 1962  2 Sheets-Sheet 1

INVENTOR.
Warner B. Smith
BY
Robert L. Kahn
Att'y

Sept. 21, 1965 W. B. SMITH 3,206,851
WIRE ANCHOR
Filed April 16, 1962 2 Sheets-Sheet 2
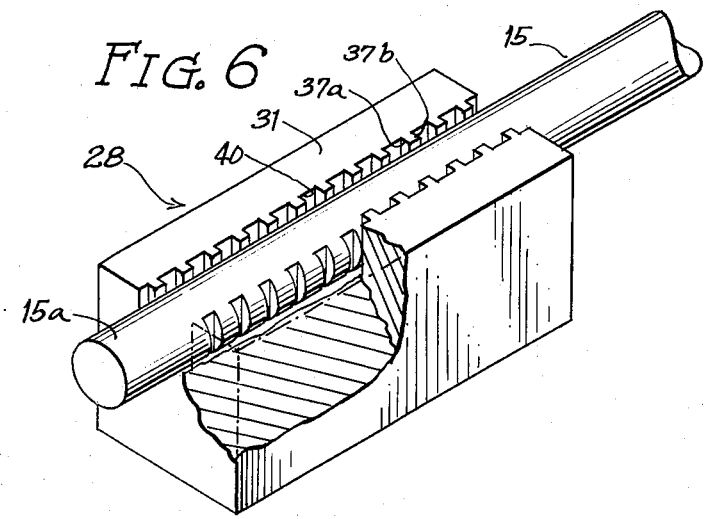
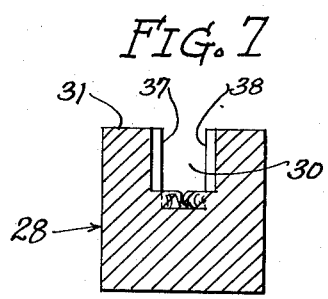
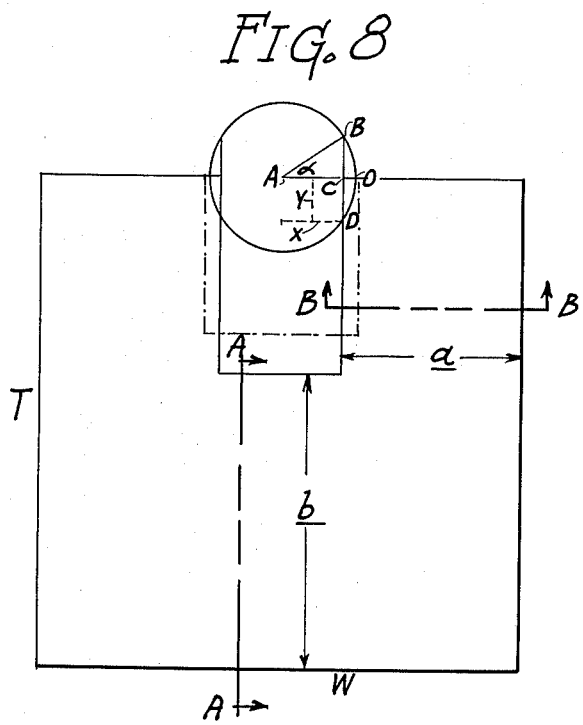
INVENTOR.
Warner B. Smith
BY Robert L. Kahn
Atty

United States Patent Office 3,206,851
Patented Sept. 21, 1965

3,206,851
WIRE ANCHOR
Warner B. Smith, Dayton, Ohio, assignor to Price Brothers Company, Dayton, Ohio, a corporation of Michigan
Filed Apr. 16, 1962, Ser. No. 190,191
6 Claims. (Cl. 30—304)

This is a continuation-in-part of my application Serial No. 67,418, filed November 4, 1960, and now abandoned.

This invention relates to wire anchor means, and more particularly to anchor means to hold or grip wire in tension. There are many instances where wire, in straight form or in helical form, must be maintained in tension indefinitely. For example, concrete pipe, steel cylinder pipe, beams, columns, slabs and other similar items are provided with tensioned wire reinforcement. The invention will be described in connection with pipe having tensioned wire reinforcement wound around the same. It is understood, however, that this is merely exemplary.

In the manufacture of pipe for use in sewer lines, water lines and the like where the piped diameter may range from about 16 inches to more than nine feet, it is common to provide tensioned wire reinforcement in the form of a helix around the pipe. The reinforcement serves to aid the pipe in withstanding high liquid pressures and also aids the pipe in withstanding the so-called "back-loading" of a pipe buried in a trench and subject to traffic. The wire reinforcement is commonly applied to concrete pipe or so-called cylinder pipe having a steel or iron shell within the pipe wall. As a rule, such pipe has steel wire wound around the same for circumferential reinforcement, after which the wire is covered with a protective layer of concrete or similar material.

The wire reinforcement is tensioned to prestress the pipe and the tension must be maintained on the wire at all times to retain the design characteristics of the pipe. The amount of tension and pitch of the wire helix are design factors which will vary with the wire diameter, the amount of prestress desired and the working pressure of liquid within the pipe. Inasmuch as these are all well known, no detailed description of the design of such pipe is necessary.

Generally the pipe described above is made in uniform lengths and has the pipe ends suitably designed to facilitate the creation of suitable joints between adjacent pipe ends. As a rule, all such pipe lengths, whether concrete or cylinder type, have metal, usually steel, rings forming part of the end structure of a pipe length. Generally, one end of a pipe may have a bell shape and the other end of the pipe may have a spigot shape. Sometimes a pipe will have both ends similar.

It has been customary to provide suitable anchor regions on the metal ring at each pipe end to which the beginning or leading part and end or trailing part of the reinforcing wire are attached. The beginning of the reinforcing wire is attached first, after which the wire is wound on over the pipe under suitable tension. After the winding operation is completed, then the end of the wire, while under tension, must be attached or anchored to the pipe ring.

Considerable difficulty has been experienced in providing satisfactory wire anchorage for pipe. The wire itself is wound over the pipe under great tension and unless the tension is maintained at the desired level for the life of the pipe, serious impairment of the pipe characteristics will result. The tension is obtained by stretching the wire. The elongated wire must therefore be prevented from shortening at any time.

Many wire anchoring means have been provided but have proven objectionable. Such anchoring means have permitted the wire to shorten to permit a grip on the wire. Other anchoring means are objectionable because they have been too expensive to use or have required elaborate accessories during winding for application of the anchoring means. Still other anchoring means have been undesirable because of the damage to the wire, generally resulting in weakened wire ends and consequent failure.

This invention provides simple wire anchor means which can be easily used on all kinds of products, particularly pipe, with minimum expense and minimum interference with conventional manufacturing procedure. The present invention eliminates the necessity for any shortening of wire and eliminates any possibility of weakening the wire due to bending. The invention in general contemplates a fixed stop block permanently attached to the item carrying the tensioned wire and a wire anchor as a separate piece, which can grip the tensioned wire and which can be easily positioned to be braced by the stop block. As applied to pipe, the stop block is permanently attached to the pipe ring while the wire anchor is a separate item which is attached to the wire. One such wire anchor is attached preliminary to the wire winding. The remaining wire anchor is attached to the wire after winding, while the wire is still under tension. The wire anchors are positioned by hammering to dispose the anchor in proper position with respect to the tensioned wire and at the same time in wedging position with respect to the stop block. Instead of hammering, hydraulic pressure means or other means may be used as will be apparent later.

An important feature of the present invention resides in the fact that it provides a positive gripping action of the anchor on the wire that does not involve bending, kinking or curling the wire. The invention involves cutting by the new anchor of slots in the wire transverse thereto incident to the gripping of the wire. The cutting is to eb disinguished from swedging or flowing of the wire metal to assume a different shape. The slots are cut during the installation of the anchor. By controlling the design of the slot cutting parts of the anchor, an accurate control of the shape, extent and location of the wire gripping areas is obtained. Consequently a precise and predetermined wire gripping action will always be obtained. Furthermore, all this is obtained without changing in any manner the amount of tension on the wire during or after the installation of the anchor.

The invention has wide application but its versatility is best illustrated by its application to pipe as illustrated in the accompanying drawings.

FIGURES 6 and 7 are perspective and end views of the wire anchor.

FUIGRE 8 is a diagram in connection with theoretical analysis of the design of a wire anchor embodying the present invention.

Figure 1:
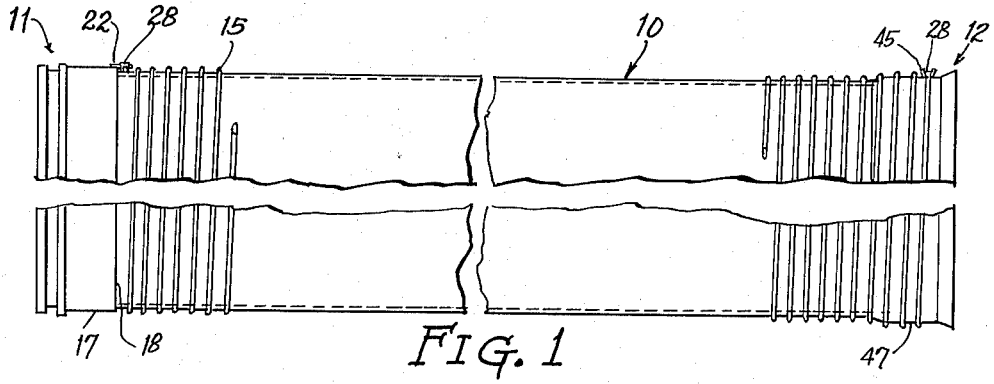
FIGURE 1 is an elevation of a length of pipe provided with the wire anchors embodying the present invention, the pipe being shown broken to save space.
Figure 2:
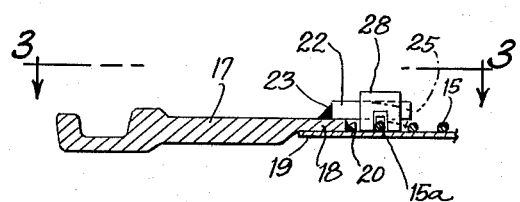
FIGURE 2 is a sectional detail on line 2—2 of FIGURE 3 illustrating the wire anchor and stop block at the leading end of the tensioned wire.
Figure 3:
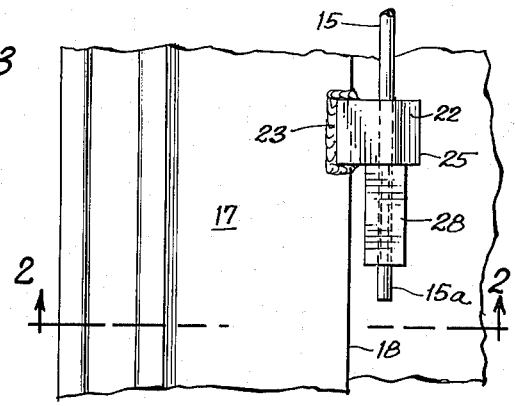
FIGURE 3 is a plan view of a detail on line 3—3 of FIGURE 2.

A length of pipe 10 has ends 11 and 12. Pipe 10 may have any desired construction and includes helical wire reinforcement 15. Pipe ends 11 and 12 have any desired shape and for convenience are shown as having spigot and bell ends respectively. Spigot end 11 includes as part thereof steel or iron ring 17 whose inner end 18 is here illustrated as being around end portion 19 of a steel or iron pipe having a relatively thin wall. The two are welded together at 20. In the construction illustrated, the spigot wall is thick enough so that the metal can withstand the pipe pressure and therefore no wire reinforcement around the spigot is required. Accordingly, stop block 22 of steel or iron is welded as at 23 to spigot end 11 near inner end 13. Stop block 22 extends beyond the inner end of spigot ring. Stop block 22 is heavy enough so that it can withstand the twisting force to which it will be subjected. Before tension is applied to wire 15, stop block 22 has its free end 25 bent downwardly toward wire 15, as shown in FIGURE 2 in dotted line.

Wire end portion 15A is now ready to be anchored. To accomplish this, wire anchor 28 is now necessary. Wire anchor 28 is made from a block of steel, the block preferably having a generally rectangular cross section. The block may be made of any suitable steel which can be hardened. As an example, the block may be made of low carbon cold drawn steel available in the trade under the designation C 1018, or it could be an alloy steel, either of which can be heat treated. The steel must be capable of being hardened so that it will cut the metal wire to be gripped.

Wire anchor 28 is quite long in comparison to its transverse dimensions. The mechanical properties of the wire anchor will be described later in connection with a description of the operation. Wire anchor 28 has U-shaped slot 30 in face 31, slot 30 running the entire length of the wire anchor. Slot 30 has a generally rectangular shape provided with bottom 33 and sides 34 and 35. These sides are cut to provide teeth 37 and 38 on the two side walls of the slot. Teeth 37 form one set and teeth 38 form another set. The teeth may be obtained by using a broach and forcing the broach into the slot from outside face 31 toward bottom 33 of the slot. Each tooth has side faces 37a and 37b spaced from each other along the length of block slot 30 with flat surface 40 being disposed between the side faces of adjacent teeth. Thus block 28 may be considered as having a longitudinal slot 30 provided with teeth 37 and 38 extending laterally from each flat side wall 40 toward the opposing parallel flat side wall. Each tooth terminates in a flat tooth face parallel to side wall 40 of the block slot. The terminating tooth face meets tooth side faces 37a and 37b to provide straight sharp cutting edges which are laterally offset from each other along the length of the block slot and which extend parallel to the depth of block slot 30. The intersection of the terminating flat tooth face and block face 31 also provides a sharp cutting edge extending between the previously named parallel cutting edges.

The distance between opposing metal must be smaller than the diameter of wire 15 to be anchored. The steel for wire 15 is hardened and has some spring characteristics. As an example, for use in reinforcing pipe, wire 15 may have an ultimate strength of about 190,000 lbs. per sq. in. This wire is usually tensioned during winding to about 70% of its ultimate strength. It is therefore important that the wire anchor maintain a tight grip on the wire. Wire 15 is hammered into position within the slot and between the teeth. The wire anchor must have its teeth hard enough to cut slots into the wire to be anchored. The teeth of the wire anchor are case hardened to a sufficient depth to accomplish this. In practice, the depth of the case hardening may be of the order of about .005 inch. The hardness of the teeth may be about equal to the teeth of a file.

Figure 4:
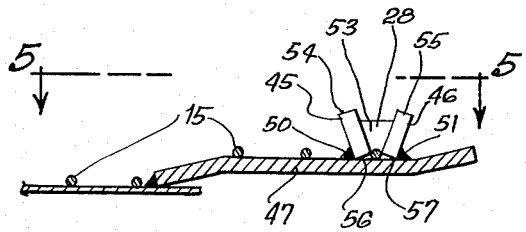
FIGURE 4 is a sectional detail on line 4—4 of FIGURE 5 for the trailing end of the tensioned wire.
Figure 5:
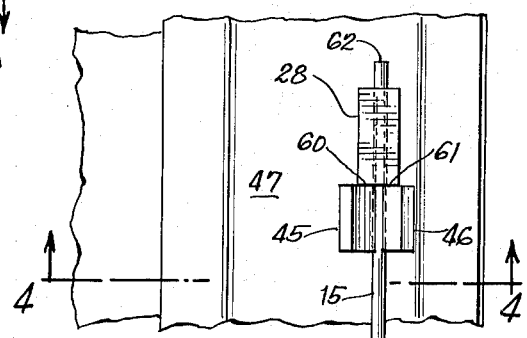
FIGURE 5 is a plan view of a detail on line 5—5 of FIGURE 4.

Referring now to FIGURES 4 and 5, wire anchor 28 is used at both ends of the reinforcing wire for retaining the wire in tension. The trailing end portion of the reinforcing wire has its wire anchor 28 used in conjunction with a stop block of different construction from that used at the leading end of the reinforcing wire. While the stop block at the trailing end could be similar to stop block 22 and the leading end, it is preferred to use a stop block to be described.

Two rectangular blocks of steel 45 and 46 are rigidly attached to steel cylinder or sleeve 47, which, in the example illustrated here, will constitute the bell end of the pipe section. Blocks 45 and 46 are welded at 50 and 51, the two blocks being inclined toward each other to provide a tapering passage 53 extending along the wire length, the taper being inward with the passage depth. Thus blocks 45 and 46 provide a wide mouth at tops 54 and 55 of the blocks into which wire 15 may be directed. It is understood that wire 15 will be under full winding tension when this occurs. Bottoms 56 and 57 of the blocks have their opposing parts separated just enough to accommodate wire 15. The exact separation is not too important, since the hard wire can force its way past the block bottom portions to rest upon the surface of the sleeve. The blocks are of soft steel and their function is to provide good anchorage for wire anchor 28.

With wire 15 still under tension and positioned between blocks 45 and 46, wire anchor 28 is disposed over the wire at the far end of blocks 45 and 46. Anchor 28 has its slotted face 31 disposed downwardly facing steel sleeve 47. With wire 15 still under tension, wire anchor 28 is hammered over the wire till it is down against the sleeve. It is important that wire anchor 28 be disposed against ends 60 and 61 of the anchor blocks. Thus wire anchor 28 is forced into its proper position with the wire anchor braced against anchor blocks 45 and 46. Wire 15 is now tightly gripped by wire anchor 28 and may be severed at 62 from the main body of the reinforcing wire.

It will be noted that wire anchor 28 at the beginning or leading end of the wire reinforcement is also positioned with its slotted face down against end portion 19. The finished wire reinforcement and anchors may be covered with a layer of cement, asphalt or other suitable means to protect against damage.

By virtue of the arrangement described, and particularly the inverted position of the wire anchor, it becomes unnecessary to perform any welding upon the wire anchors. This is important, since any welding steps on the finished wire anchors result in drawing some of the temper from the hardened steel teeth, thus impairing their biting action. In addition, the inverted position of the wire anchors retains the reinforcing wire tightly against the adjacent pipe surface and aids in maintaining the tension in the wire.

The invention may be readily applied to concrete pipe rather than cylinder pipe. Thus in concrete pipe manufacture, it is customary to have steel or cast iron rings at the two ends of a pipe length or section. In such case, the stop block at the leading end of the reinforcing wire would be welded to the metal rather than overhanging part as illustrated in FIGURE 2. Both stop blocks at the two ends of the reinforcing wire would be secured on the steel rings in the manner generally illustrated in FIGURE 4.

Where the metal rings at the pipe ends are strong enough, the stop blocks at the leading end may be mounted as illustrated here in FIGURE 2 if that is desired. It is also possible to use the stop blocks now illustrated at the trailing end (blocks 45 and 46) at both ends of the reinforcing wire. Various other kinds of stop blocks may be used in connection with the wire anchors. As a rule the curvature of the pipe upon which the wire anchors are used is so gradual that the wire anchors can be straight along their lengths. However, it is possible to curve the wire anchors to conform to the curvature of the pipe upon which they are to be used. In all instances, however, the U slot as viewed in plan from above the top face of the anchor block will appear to be straight so that, in effect, the U slot is longitudinally straight.

It is understood that the wire anchors are fabricated and shaped while the steel is soft, with the temper drawn. After the wire anchors are finished, they are hardened.

It is possible to weld an anchor to any kind of fixture or length of rod which can be buried in concrete to firmly retain the wire anchor. As an example, the anchor as shown in FIGURE 7 can rest upon a heavy steel rod or plate to which it may be welded. The heavy rod or plate may be buried in the concrete prior to casting of the concrete. The heavy steel plate may be bent and perforated to provide an excellent bond with the concrete. Or the rod or plate to which the anchor is welded, may itself reach down into the concrete and be welded to reinforcing rods running longitudinally of the pipe. In such case, the anchor mounting rods or plates will have to be incorporated in the concrete pipe prior to casting. The anchor may also have threaded apertures extending upwardly from the bottom (referring to FIGURE 7) to permit bolting the anchor down. So long as the wire to be gripped can be hammered into place, bolt holes or threaded apertures can be provided any place in the anchor block.

Referring now to FIGURE 8, there is illustrated a diagrammatic representation of a wire anchor. The wire with which the wire anchor is adapted to be used is shown by a circle whose radius is AB. The one-half width between opposing tooth faces is less than AB and is represented by AC. The total width between the outer sides of the anchor is represented by W, while the total depth from the top to the bottom outer faces of the wire anchor is represented by T. The thickness between the outer side of the anchor and the inside face of a tooth is indicated by $a$. The thickness from the bottom of slot 30 of the wire anchor to the bottom outer face is represented by $b$.

A wire anchor embodying the present invention operates on the principle of shearing an outer portion of the wire so that AB will always be larger than AC. $\alpha$ is the angle between AC and AB.

In practice, wire ranging from about 1/8" to 1/2" in diameter can use the new anchor. Let it be assumed that a wire anchor is going to be designed for No. 6 wire. This wire has a diameter of .192". In practice, $\alpha$ should be about 30° and in this particular instance, because of dimensions selected, $\alpha$ comes out to be about 28° 57'. By calculation, the chord length BCD, which is equal to 2BC, comes out to .093". The arc length BOD comes out to .097".

If the wire has an ultimate tensile stress of 192,000 p.s.i., then for the size wire assumed, the maximum wire load is 5,550 pounds.

The number of teeth required is obtained by taking the maximum wire load of 5,550 pounds and dividing it by the product of the arc length of BOD, which is .097" times the width of each tooth, which as an example can be taken as 3/64", times the ultimate shearing stress in the anchor, which, in the type of steel used, is 80,000 p.s.i. By using a factor of safety of 1.5, the number of teeth comes out to be between 23 and 24, so that 24 teeth may be assumed.

The shear in the wire can be calculated by taking the chord length BCD of .093" times the difference between the pitch of the teeth, which is 1/8", and the width of the teeth, which is 3/64", multiplied by the number of teeth, 24. Again using the factor of safety of 1.5, the shear comes out to be 47,800 p.s.i., which is just within the shearing limit of 50,000 p.s.i. for this particular grade of wire. As can be readily understood, the various dimensions have to be so taken that the shear in the wire must not exceed the ultimate shearing stress in the wire. The length of the anchor is one-half of the product of the pitch, which is 1/8", and the number of teeth, which is 24, and comes out to 1.5".

It will now be necessary to determine the transverse dimensions of the sides and bottom of the wire anchor. In order to compute this, it is necessary to calculate the area of the segment defined by arc BOD and chord BCD. The area of this region turns out to be one-half of the difference between the arc length BOD multiplied by the wire radius AB and the chord length BCD multiplied by AC, and this calculates out to .00075" sq.

If Y is assumed to be the vertical shearing component on the wire and if X is assumed to be the horizontal component of the shearing force when the wire is first introduced into the anchor, then these components may be calculated as follows.

Y is equal to the ultimate shearing stress in wire, assumed to be 50,000 pounds p.s.i. multiplied by the following:

The width of teeth, 3/64" times a chord length, BCD, here .093" times 12, which is the number of teeth on one side of an anchor having opposing teeth, plus 24, which is the number of segments on one side of an anchor, multiplied by the area of segment BODC; Y comes out to be 3500 pounds. X may be readily calculated through the fact that magnitude of Y and $\alpha$ are both known and comes out to be 6230 pounds.

Looking at a section of the bottom of the wire anchor as indicated by arrows A—A, the bending moment can be calculated as follows:

The sum of the depth of the wire anchor, which is 9/32", plus one-half of $b$ multiplied by X, gives the bending moment in one direction, plus the distance AC times the Y gives the bending moment in the other direction.

The section modulus at section A—A works out to be $.25b^2$. The ultimate bending stress in the anchor is 115,000 p.s.i. due to the steel characteristics and this is equal to the bending moment divided by the section modulus. The final calculation comes out that $b$ works out to .326". T is the depth, which is 9/32" plus $b$, and this comes out to about 5/8".

It will now be necessary to calculate the bending moment along section B—B. This is the depth, 9/32" times X less one-half of $a$ times Y, and this works out to be 1750 minus 1750$a$. The section modulus in this section is $.25a^2$. The ultimate bending stress in the anchor, which is 115,000 pounds, is equal to the bending moment divided by section modulus. Solving for $a$ gives .220".

The total width W is 2$a$ plus the distance between the opposing teeth, which in this instance is .168", and comes out to about 5/8".

The depth of the teeth can be arbitrarily taken as 1/32". Since the wire exerts compression upon the teeth, considerable latitude in the depth is permissible. However, inasmuch as the teeth must also withstand a shearing action after the wire is in place due to the tension on the wire, it is preferred to have shallow teeth insofar as depth is concerned. The shearing action on the wire will in part determine the pitch of the teeth. The actual shearing force on the teeth is greatest at the end teeth where the wire tension exists and drops off along the wire in the anchor away from the end.

The width of a tooth (dimension along the length of the wire anchor) may assume a large variety of values. If for example, one tooth having very small width is assumed, then such a tooth will have insufficient shear strength to withstand the pull on the wire hammered into it. There will be no difficulty cutting the slots in the wire, since the length of a tooth (this will be equal to the depth of slot 30 less the chip) will always be the same. The end tooth or teeth (where the tension is greatest) will probably be pulled sideways by the wire in the direction of wire tension and gradually as tension is transferred to more teeth back of the leading teeth (those teeth at the end of the wire anchor where the tensioned wire emerges from the wire anchor), more and more teeth may fail.

Going to the other extreme, suppose a tooth is very wide so that theoretically one tooth should suffice for shear due to the wire tension. The entire load of the tensioned wire will fall on the trailing side of the slot on the wire (represented by area BODC in FIGURE 8) and also on the cooperating face of the tooth. It is possible that the metal can not withstand this. Hence in practice the width of a tooth will be between these extremes. The end teeth even in the design example given above probably have some tendency to yield under the wire pull and thus transfer part of the load to the second teeth and so on. Insofar as spacing between adjacent teeth is concerned, the same considerations apply to the metal of the wire. Too close a tooth spacing will impose excessive stress on the slot sides of the wire. Too great a spacing is wasteful. In general, the spacing between teeth should be at least as great as the tooth width and may be as much as two or three times the width of a tooth.

The tooth dimensions are very important for the end teeth and the importance of the tooth dimensions drops as the teeth are further back from the emerging tensioned wire. With regard to tooth shape, a generally rectangular tooth (viewed endwise looking down toward the slot bottom) is the best. With such a tooth shape, after the wire has been hammered into position and the slots cut into the sides of the wire, as shown for example in FIGURE 6, it will be clear that there will be substantially no component resulting from the wire tension on the teeth which would tend to open up the jaws of the wire anchor. Since the sides of the teeth are perpendicular to the length of the wire, substantially all of the force due to the tension will tend to move the teeth laterally along the wire in the direction of pull or tension. This will be pure shear.

Now let it be assumed that the sides of the teeth instead of being perpendicular to the direction of the length of the wire or the length of the wire anchor block are at an angle. The side faces of the teeth will go straight down from top face 31 of the wire anchor block perpendicular to the length of the wire. Thus assuming that face 31 is a top face of the wire anchor block and is horizontal and assuming that one is looking from the end of the block along the length of the wire, as seen in FIGURE 6 for example, then the sides of such modified teeth will lie in perpendicular planes but will not be normal to the line of view or, in this case, to the length of the wire. If the sides of the teeth are so directed that the width of a tooth across the base is less than the width of a tooth at the tip, then a sort of dovetail structure will result. Such teeth are not objectionable, providing that the resistance of the teeth at the base of each tooth is not impaired against the shearing load referred to above.

If, however, the tooth sides are so disposed that the width of a tooth across the base is greater than across the tip of a tooth, then a different action will result. The sloping sides of each tooth in such a construction will create an undesirable component in the wire anchor block as the result of tension on the wire. This undesired component will be proportional to the sine of the angle and will be in the direction tending to spread the jaws on opposite sides of slot 30. As a result, dimensions *a* and *b* illustrated in FIGURE 8 will have to be greater to overcome this component. It should be noted that the above component is created as the result of tension on the wire and is to be distinguished from the component tending to open the jaws of the wire anchor when the wire is hammered into position.

In all cases, the end edges of all teeth at face 31 of the wire anchor block are sharp as well as hard. Obviously, if the teeth do not start to cut slots into wire 15, hammering the wire in will result in a displacement of metal in wire 15 rather than removal and will consequently impose a far greater spreading force upon the jaws of the wire anchor block.

It will be understood that flaring of the tooth sides for a small angle, say about 10° or 20° on each side, to make the base of a tooth a bit wider than the tip of the tooth will not be undesirable since the jaw spreading force discussed above will be relatively small. In fact, some flare may be difficult to avoid because of lack of precision in making the broaching tool.

It will be evident from the foregoing design considerations that a wire anchor embodying the present invention is essentially a cutting tool for providing a large number of slots transversely of the wire for the purpose of providing mechanical keys between the wire and anchor. Thus hard sharp corners in the anchor are necessary. It will be evident that theoretically there is no necessity for having teeth opposed to each other as distinguished from being staggered on opposite sides of the wire or for having teeth on more than one side of the wire. Inasmuch as the maximum shearing effect is present at the end teeth, it follows that a more efficient anchor will have teeth on opposite sides of the wire. However, the pitch of the teeth need not be uniform along the length of an achor. If teeth on only one side of an anchor are used, then it may be desirable to increase the height of a tooth (this is the distance between the tip of the tooth and the bottom or base of the tooth).

In general, the wire anchor is designed to provide sufficient strength to the bottom and sides and to provide sufficient cutting teeth so that for the amount of shear required to force a wire in position in the wire anchor, there will be negligible opening of the anchor jaws. With regard to the amount of wire sheared and the depth of the shear from the outer surface of the wire, the following considerations will have to be observed. The slots cut into the wire should preferably have a depth at any point along the wire of no more than about 20% of the total wire diameter. If the teeth of an anchor are opposite each other, then each tooth should not bite into the wire more than about 10% of the wire diameter, assuming that the teeth are equal in height. The height of a tooth should preferably be just a bit larger than the maximum depth of cut of a tooth into the wire. It is understood of course that the teeth of the wire anchor will always have cutting edges which are harder than the wire upon which they operate. Where the tensioned wire is to be maintained at a tension substantially below its ultimate yield point, then deeper slots cut by the anchor teeth may be tolerated.

The depth of the slot should be at least as great as the diameter of the wire to be handled. With simple round wire, the usable dimension of the cutting teeth toward the bottom of the slot need not necessarily be as large as the slot itself. Thus for example, where the teeth are formed by a broach, the tooth side near the bottom of the slot will not be completely formed due to the shape of the forward end of the broaching tool. This will show up as sort of a curved chip or sliver cut from the wire anchor metal. This will not interfere with the wire going down to practically the bottom of the slot in the wire anchor, due to the decreasing transverse dimension of the wire beyond the wire diameter. In general, it is preferred to make the wire anchor deep enough so that a full slot can be cut by the teeth into the wire. In practice, this will require that the depth of the slot be about equal to the wire diameter or larger. The maximum size of wire which can be accommodated by the anchor block embodying the present invention must be less than the transverse width of the slot as measured between side walls 40.

What is claimed is:

1. An anchor block for retaining an end portion of a steel wire, said block being of steel and have effectively a U-shaped slot extending for the entire block length into which the wire is forced for installation so that the block straddles the wire, said block U slot being longitudinally straight and being at least about as deep as it is wide and effectively having opposed flat and substantially parallel side walls, whose separation is the slot width, said block having a plurality of metal cutting teeth extending laterally from at least one slot side wall toward the opposite slot side wall, and each tooth having its base at the slot side wall and terminating in a flat face which lies in a plane which is parallel to and between the flat slot side walls, each tooth also having two flat side faces spaced from each other along the length of the block U slot to define the tooth width, each tooth side face meeting the tooth terminating flat face along a straight line to define a depthwise metal-cutting edge extending substantially parallel to the U slot depth dimension, this depth dimension running perpendicular to the U width and extending between the open end of the U to the bottom of the U, the opposite side faces of a tooth being arranged so that the tooth width adjacent the tooth base is substantially no greater than the width adjacent the terminating flat face, each tooth having a substantially flat end face at the open part of the block U slot, said end face being substantially perpendicular to and meeting the tooth terminating flat face and side faces to provide three connected cutting edges, the effective depth of a tooth (from the tooth terminating flat face toward the base) being such that the metal to metal spacing from a tooth terminating flat face directly across the U slot to the nearest metal is about 80% of the slot width, the separation longitudinally of the slot between adjacent teeth of a set of teeth extending from a slot side wall being at least about as great as the teeth width, the teeth being hard enough for cutting action across a steel wire of appropriate size, said cutting action providing slots transversely of the wire, the depthwise cutting teeth edges extending deep enough from the open face of the U slot to the bottom thereof to provide full cutting of the wire transversely thereof, said anchor block being strong enough to resist the force tending to spread the block U slot side walls during cutting action on the wire, said tooth base width, spacing longitudinally of the slot between adjacent teeth and total number of teeth being sufficient that, when installed and the wire being in tension, the average shear forces on the teeth along the direction of tooth width are within the respective shear limits of said teeth, the transverse dimensions of the wire after cutting being reduced by not more than about 20% of the original transverse dimensions the block as a whole maintaining its grip on the wire, said anchor block construction being functionally adaptable for appropriate sizes of wire in the range from about 1/8" to about 1/2" and avoiding substantial kinking or V-notching of the wire, whereby said block may be installed or a wire irrespective of wire tension conditions by forcing the block over the wire or vice-versa, with the direction of movement being perpendicular to the length of the wire and parallel to the U slot depth and depthwise cutting edges.

2. The construction according to claim 1 wherein a set of teeth is provided at each of the side walls.

3. The construction according to claim 2 wherein the teeth of one set are transversely aligned with the corresponding teeth of the opposing set so that the flat tooth tip faces are opposite each other.

4. The construction according to claim 3 wherein the depth from tooth terminating face toward the base thereof of the two sets of opposing teeth are substantially equal.

5. The construction according to claim 1 wherein all the teeth have the same width along the direction of U slot length.

6. The construction according to claim 2 wherein all the dimensions of all teeth are substantially the same.

References Cited by the Examiner

UNITED STATES PATENTS

| | | | |
|---|---|---|---|
| 800,462 | 9/05 | Meinecke. | |
| 2,166,847 | 7/39 | Miller et al. | 24—130 X |
| 2,375,921 | 5/45 | Hirsh | 138—140 |
| 2,977,654 | 4/61 | Page | 24—126 |
| 3,164,874 | 1/65 | Reark | 138—176 X |

LAVERNE D. GEIGER, *Primary Examiner.*

EDWARD V. BENHAM, LEWIS J. LENNY, *Examiners.*